United States Patent

Peral Hernandez

[15] 3,659,058

[45] Apr. 25, 1972

[54] AUTOMATIC DEVICE FOR DIALLING PULSES

[72] Inventor: Antonio Peral Hernandez, Tracia 27, Madrid 17, Spain

[22] Filed: May 11, 1970

[21] Appl. No.: 36,009

[52] U.S. Cl. .......... 179/90 B
[51] Int. Cl. .......... H04m 1/45
[58] Field of Search .......... 179/90 B, 90 AD, 5

[56] References Cited

UNITED STATES PATENTS

| | | | |
|---|---|---|---|
| 1,965,146 | 7/1934 | Kluge | 179/90 B |
| 1,965,121 | 7/1934 | Kardorff | 179/90 B |
| 3,118,976 | 1/1964 | Scott | 179/90 B |
| 2,491,790 | 12/1949 | Zahner | 179/90 B |
| 3,272,925 | 9/1966 | Worley | 179/90 B |
| 3,274,344 | 9/1966 | Young | 179/90 B |

FOREIGN PATENTS OR APPLICATIONS

| | | | |
|---|---|---|---|
| 1,116,740 | 11/1961 | Germany | 179/90 B |
| 396,819 | 2/1931 | Great Britain | 179/90 B |

*Primary Examiner*—Kathleen H. Claffy
*Assistant Examiner*—Tom D'Amico
*Attorney*—Wenderoth, Lind & Ponack

[57] ABSTRACT

An automatic device for dialing pulses such as telephone numbers. A revolving drum that includes a plurality of discs having on their periphery a series of groups of irregularities programmed in accordance with a determined code are selectively brought opposite a rapidly acting micro-switch inserted in the telephone line. An electric motor rotates the discs while simultaneously the telephone apparatus with which the micro-switch is incorporated is short-circuited. The micro-switch is fitted on a cursor having multiple stable positions on a shaft parallel to the shaft of the drum. The cursor is fitted with a sensing shoe sliding over extensions in the programmed discs. The discs bearing programmed irregularities for operating the micro-switch are constituted by means of independent circular sections which are fitted on the drum secured against radial and tangential forces. The drum is constituted by means of the combination of two different classes of discs, rigid and flexible. A cam on the drum produces the locking of the drum in a stable position when the apparatus is at rest and the automatic closing of a switch in the feed circuit of the motor during a complete revolution of the drum. Between every two groups of irregularities of the same disc there are fitted some separating pieces capable of bringing about the stopping of the drum and a telephonic commutation in accordance with which the telephone ceases to be short-circuited during the time that the stopping of the drum lasts. The shaft along which the cursor moves has the possibility of turning through a certain angle between two check-pieces and is acted upon by a spring that endeavors to turn it in a clockwise direction. A radial lever operates to form a block of telephonic commutation so that when the apparatus is sending pulses the telephone is short-circuited and when the block is in a situation of repose or of momentary stopping between two emissions of pulses, produced by the pieces that are inserted between the groups of programming sectors, then the telephone is in service.

10 Claims, 33 Drawing Figures

C-D

AUTOMATIC DEVICE FOR DIALLING PULSES

Figure 1:
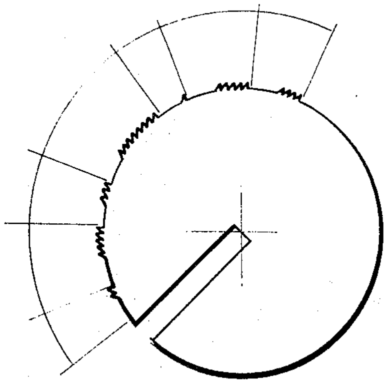

The present invention refers to an automatic device for dialling pulses, which operates electro-mechanically, and is especially, although not exclusively conceived to be utilized in the selection of telephone numbers.

The dialling devices for pulses of this type known up to now are fundamentally constituted on the basis of a shaft on which there is mounted concentrically a plurality of discs, each one of which is previously programmed in accordance with the telephone number, or combination of pulses in general, that is to be stored.

These discs can be subjected en bloc to a rotatory movement, when movement is imparted by means of an electric motor to the shaft on which the said discs are mounted, and the discs can be positioned so that they are individually situated in front of a selector device, which can be moved in an axial direction, in which device there is fitted a micro-switch which, on being subjected to the action of the disc, commences to transmit pulses to the telephone line, in accordance with the information programmed on the said disc.

The relationship between the micro-switch that transmits the pulses and the disc that causes the said micro-switch to operate is purely mechanical. Consequently, the programming has to adopt the material form of teeth, orifices or any other type of irregularity easy to produce, and capable of causing the micro-switch to operate when such said element establishes contact with it.

A direct consequence of the form in which the programming is effected is that the discs must be made of a relatively soft material, capable of being cut or deformed easily, and that it is necessary to avail of an auxiliary machine which will serve to make the cuts or deformations. Both of these requirements constitute serious disadvantages: the first, because the discs deteriorate rapidly, and the second because it increases costs and makes the operation of the device for dialling pulses difficult. As a result of these disadvantages, others which are equally important also present themselves.

In effect, since the programming of each disc, due to the form in which it is made, cannot be altered, an error on the part of the user in the making of the irregularities intended to operate the micro-switch which transmits the pulses will render the said disc completely useless.

Again, and as a consequence of the fact that the data programmed cannot be altered, if it becomes necessary to replace one piece of information by another in the memory of the apparatus, this makes it necessary to remove the disc that contained the first piece of information, and to use a new disc programmed for the purpose. From both this circumstance and from those expounded above, it follows that the users of such known apparatuses must also have a small store of virgin discs, suitable to replace those which become deteriorated or have to be changed in the course of time.

The principal purpose of the invention with which we are concerned is the production of an automatic device for transmitting pulses in which the programming of the data to be stored can be effected on the basis of a series of recuperable moduli, each one of which is endowed with a determined series of data, which moduli can be combined with one another in such a manner that they can constitute an information store of a more complex nature, which can be altered on modifying the order in which the said moduli are situated.

The form of implementation which has been established consists in dividing the discs whose units constitute the store for a complex piece of information into interchangeable circular sectors, each one of which contains a part of the total information. In this manner, on the basis of the same sectors it is possible to constitute a multiplicity of different elements of information merely by altering the order of the said sectors, and, in addition, such sectors may be constituted by a material which is as hard as is considered necessary, since they can be manufactured from the outset so as to contain the data that are considered appropriate to program all possible combinations of information.

Another purpose of the invention, in its application to the selection of telephone numbers, is the effecting, in an automatic manner, of stops or intervals in the dialling between each group of pulses constituting a complete piece of information (a telephone number), with the aim that the telephone shall receive two or more tones when it is called by means of an apparatus which, in order to obtain the communication sought, must previously communicate with more than one exchange.

In order to achieve these effects, it is necessary to create a new mechanical and electrical organization of the different elements that constitute the device for dialling pulses, so that its operation will be as simple as possible, and its functioning highly efficient.

In the annexed set of drawings, the figures show the following:

FIG. 1. Diagram of a disc for programming pulses, which corresponds to the known system of organization.

Figure 2:
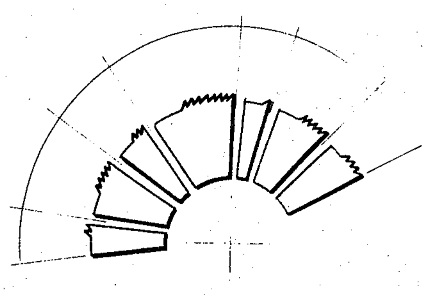

FIG. 2. Diagram of a combination of circular sectors, representing a system of programming, designed in accordance with the system of organization that is proposed.

Figure 3:
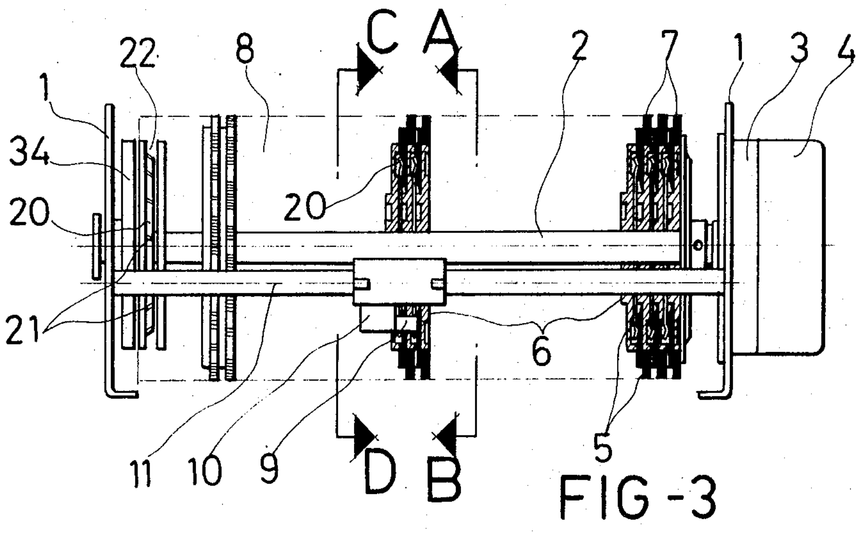

FIG. 3. A schematic elevation view, partially sectioned, of the drum on which there are mounted the groups of circular sectors that incorporate the memorized data. There may be also observed in this Figure, sliding parallel to the shaft of the drum, another shaft on which there is fitted in such a manner as to enable it to slide, a cursor that incorporates the micro-switch that is caused to operate by the irregularities in the circular sectors that constitute the memory.

Figure 4:
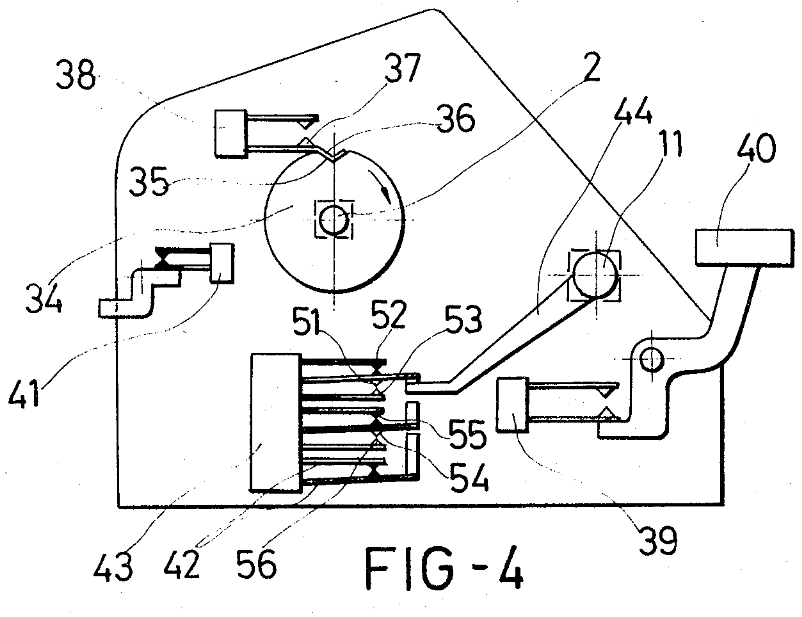

FIG. 4. A schematic lateral elevation view of the framework of the apparatus, which shows the arrangement in which the various switches that the framework incorporates are situated, the situation of the shaft of the drum and the situation of the cursor, and a block constituted by two leaf switches and another a switch, which is controlled by a radial extension of the shaft of the cursor.

Figure 5:
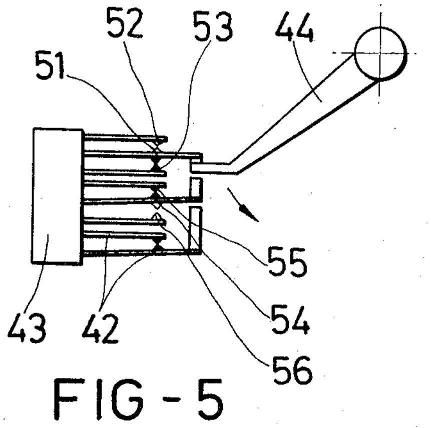
Figure 6:
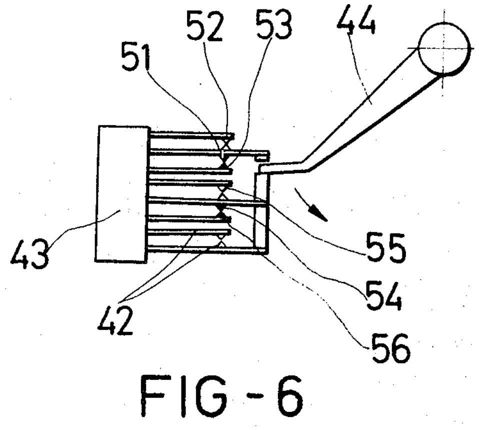

FIGS. 5 and 6. These represent two different positions of the functioning of the block of the two leaf switches and the other switch shown in FIG. 4.

Figure 7:
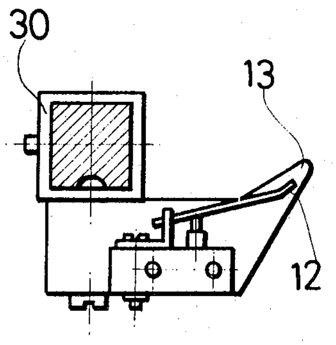

FIG. 7. A detail of the cursor, seen in a lateral elevation, fitted on its shaft and allowing the micro-switch and the shoe that it incorporates to be seen.

Figure 8:
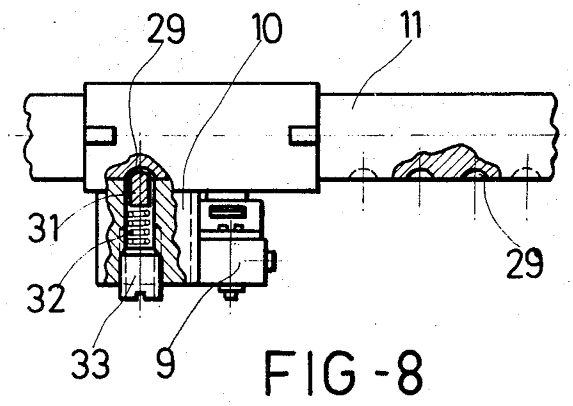

FIG. 8. A posterior elevation view of the cursor, partially sectioned so that the form in which it is anchored on the shaft may be seen.

Figure 9:
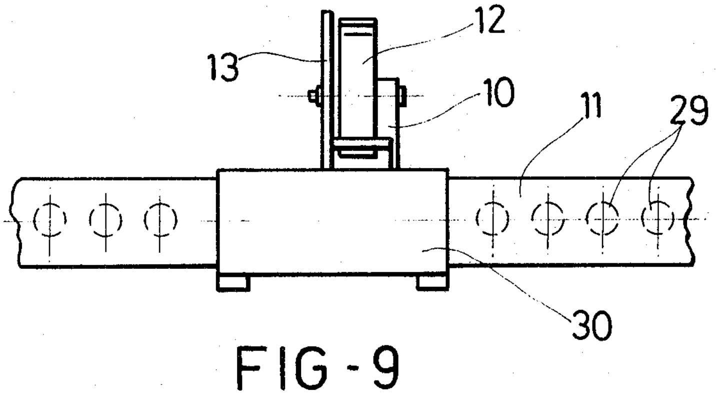

FIG. 9. A plan view of the cursor fitted on its shaft.

Figure 10:
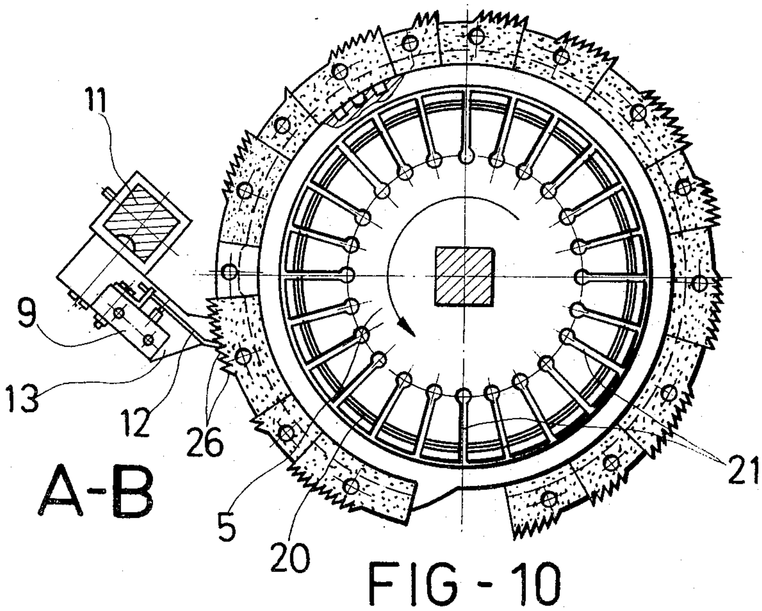

FIG. 10. A detail that enables the form in which the cursor operates to be appreciated. This corresponds to a section along the line A-B of FIG. 3.

Figures 11, 12:
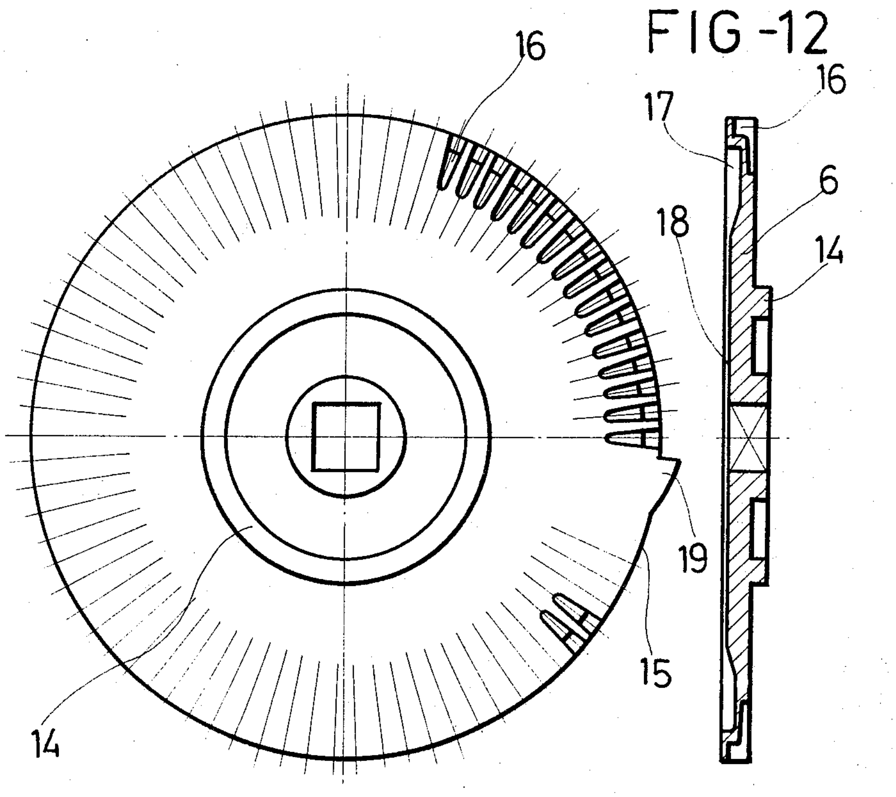

FIG. 11. A plan view of one of the pieces, constituting the support for the circular memory sectors.

FIG. 12. A sectioned elevation view of the piece represented in the previous Figure, with amplified detail of the configuration of its periphery.

Figure 12A:
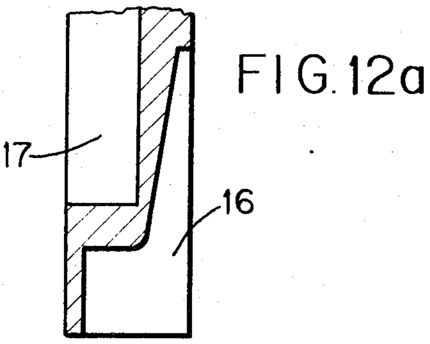

FIG. 12*a*. An enlarged portion of FIG. 12.

Figure 13:
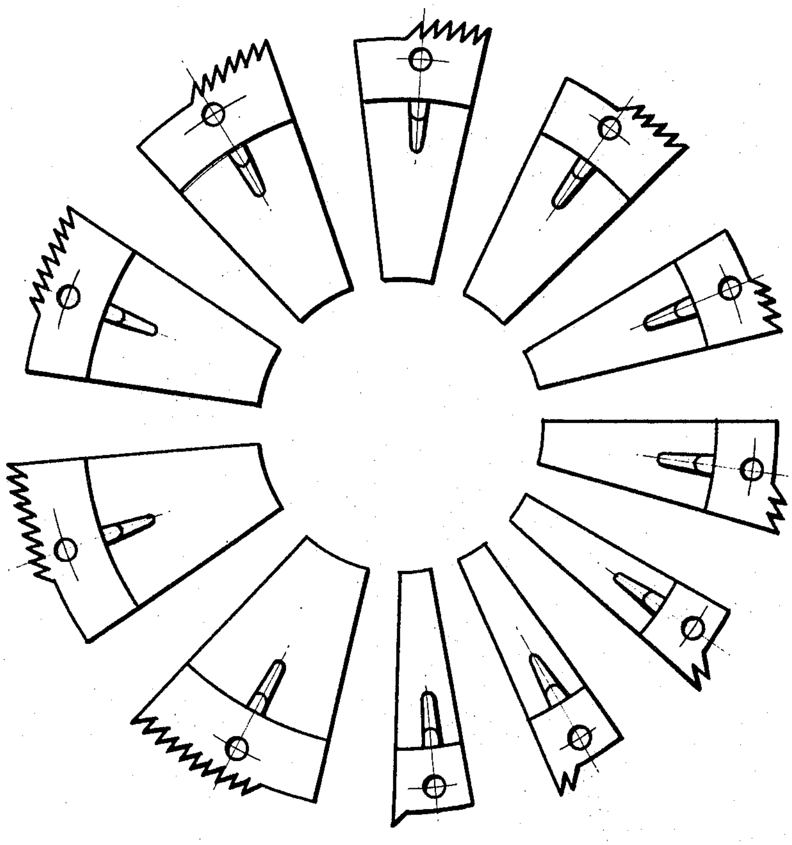

FIG. 13. A set of memory sectors for producing telephone codes on the basis of ten digit numbers.

Figure 14:
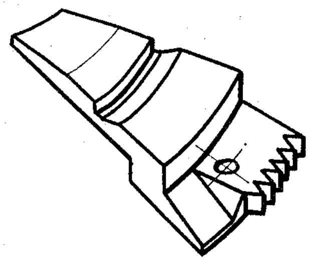

FIG. 14. A perspective view of a memory sector, in accordance with the invention.

Figure 15:
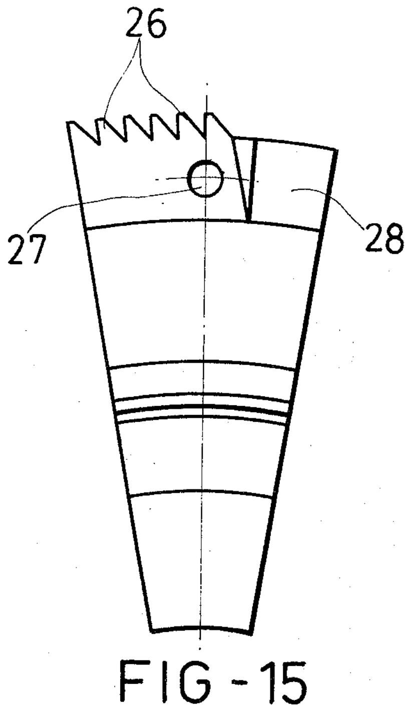

FIG. 15. Front elevation of the said sector.

Figure 16:
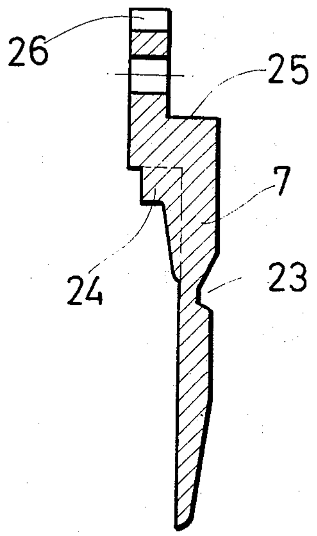

FIG. 16. Sectioned elevation of the said sector.

Figure 17:
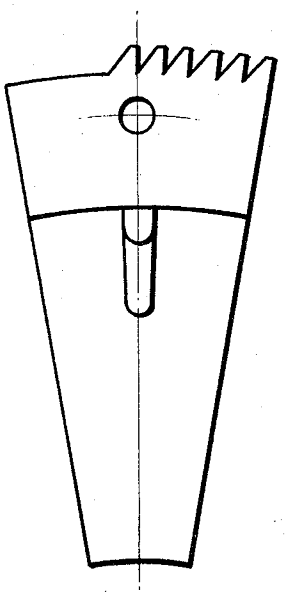

FIG. 17. Posterior elevation of the said sector.

Figure 18:
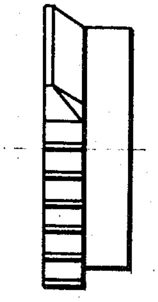

FIG. 18. Upper plan view of the said sector.

Figure 19:
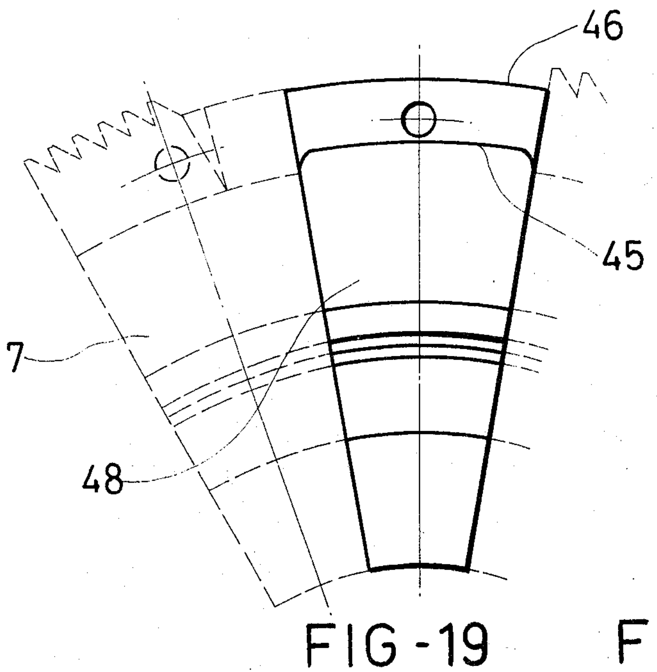

FIG. 19. Front elevation view, in the position of assembly, between two memory sectors, of the element that causes the stop or interval in the dialling of pulses, with a view of the element for producing a second dialling tone.

Figure 20:
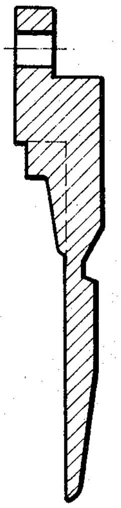

FIG. 20. Sectioned elevation of the said element.

Figure 21:
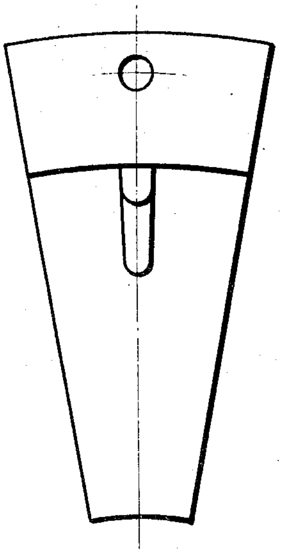

FIG. 21. Posterior elevation of the said element.

Figure 22:
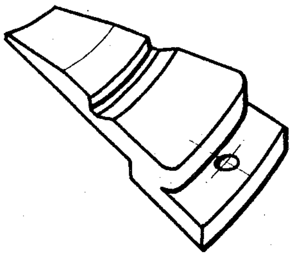

FIG. 22. Perspective view of the said element.

Figure 23:
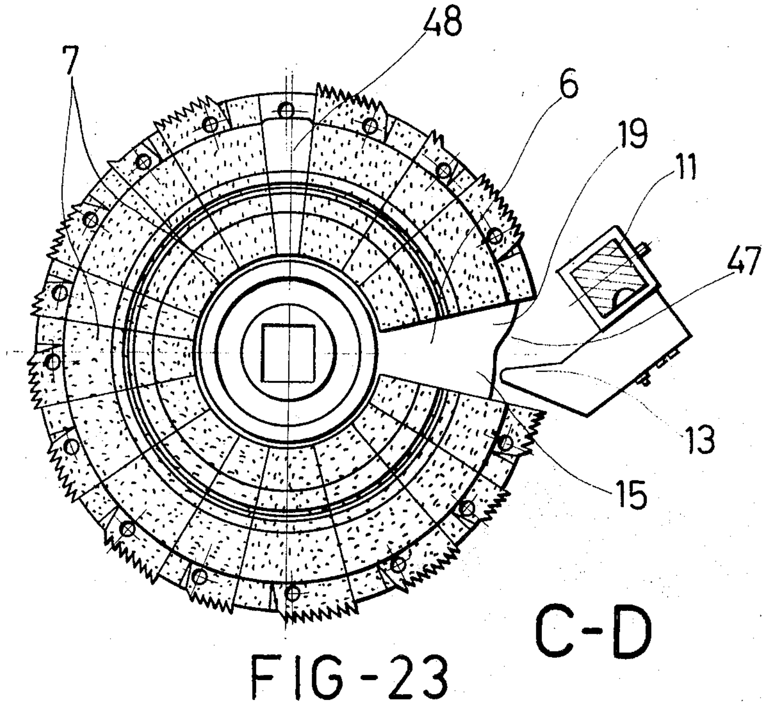

FIG. 23. Shows one of the supporting discs of the memory sectors in accordance with a section along the line C-D of FIG. 1, in which it may be appreciated that when it is completely full there remains, thanks to the special configuration of a part of its periphery, a small arc that cannot have mounted on it such memory sectors, and which in conjunction with those of the remaining discs constitutes an axial channel along the drum in which there is housed the shoe of the cursor when it is in repose.

Figures 24, 25:
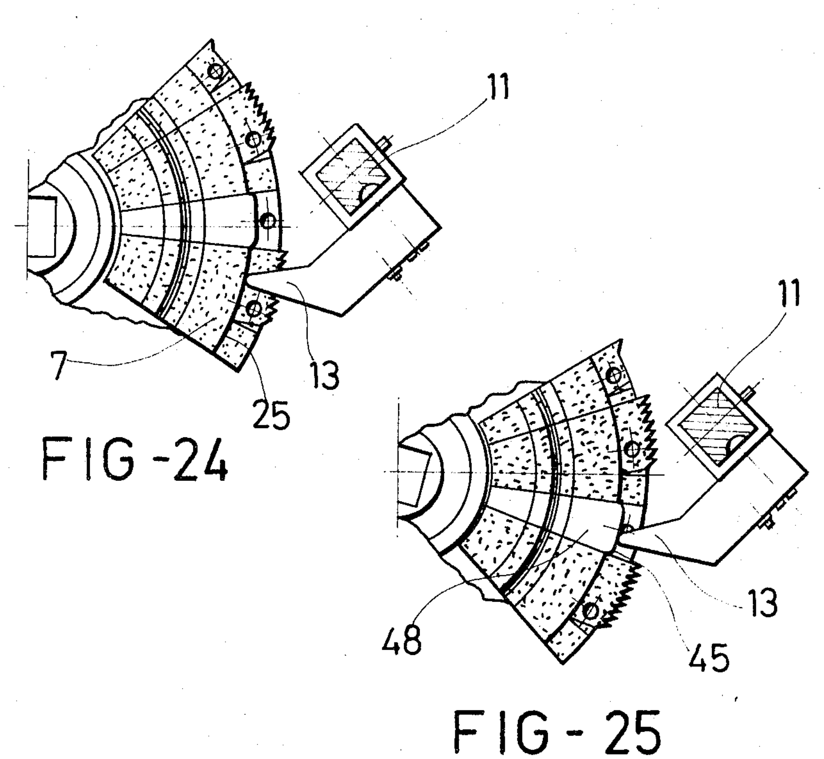

FIG. 24. Shows a detail of the supporting disc represented in the previous Figure, with the shoe of the cursor situated in the position corresponding to the dialling of pulses.

FIG. 25. Shows another detail of the supporting disc represented in FIG. 23, with the shoe of the cursor situated in the position corresponding to an intermediate stop between the dialling of two groups of pulses, to await a second tone.

Figure 26:
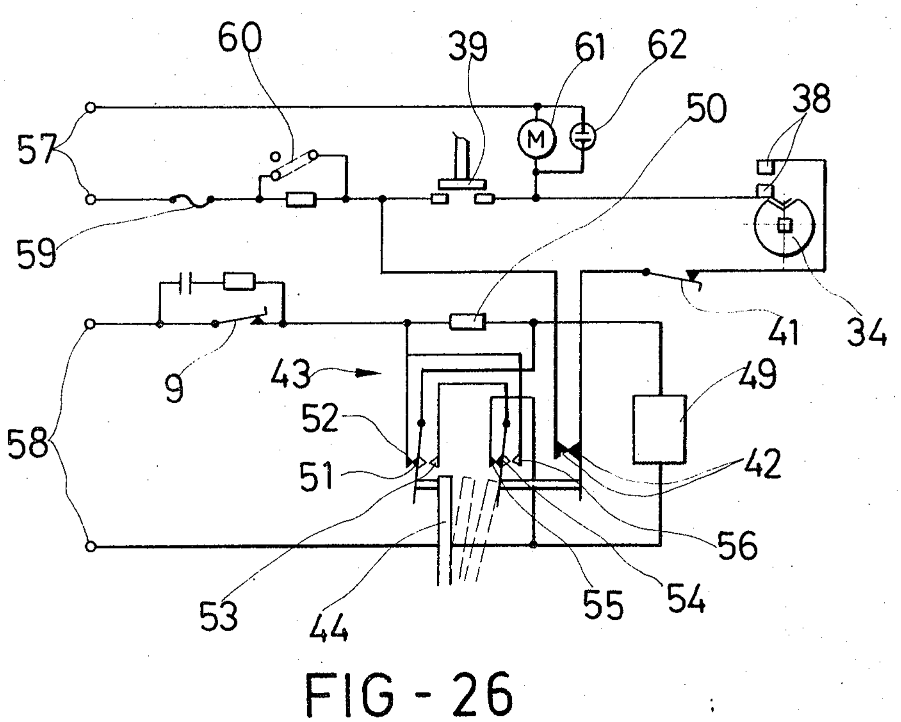

FIG. 26. Electrical diagram of the apparatus, including the telephone circuit and the circuit of the driving motor.

Figure 27:
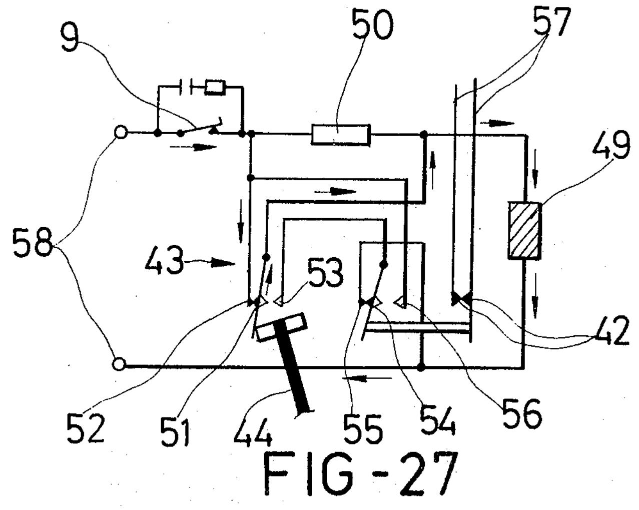

FIG. 27. Electrical diagram of the telephone circuit, with its different switches in the position corresponding to the apparatus in a state of repose.

Figure 28:
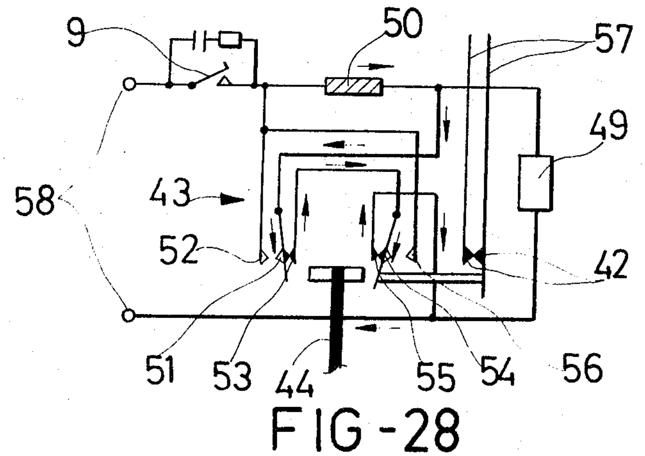

FIG. 28. Represents the diagram of FIG. 27, corresponding to the moment of dialling pulses.

Figure 29:
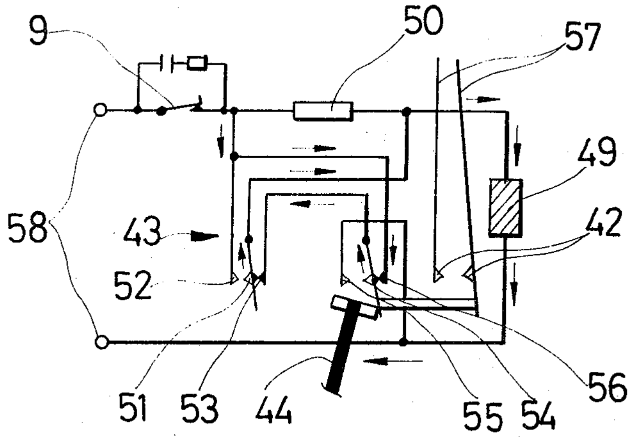

FIG. 29. Represents the diagram of FIG. 27 corresponding to the moment of stopping between two diallings of pulses in order to await a second tone.

Figures 30, 31, 32:
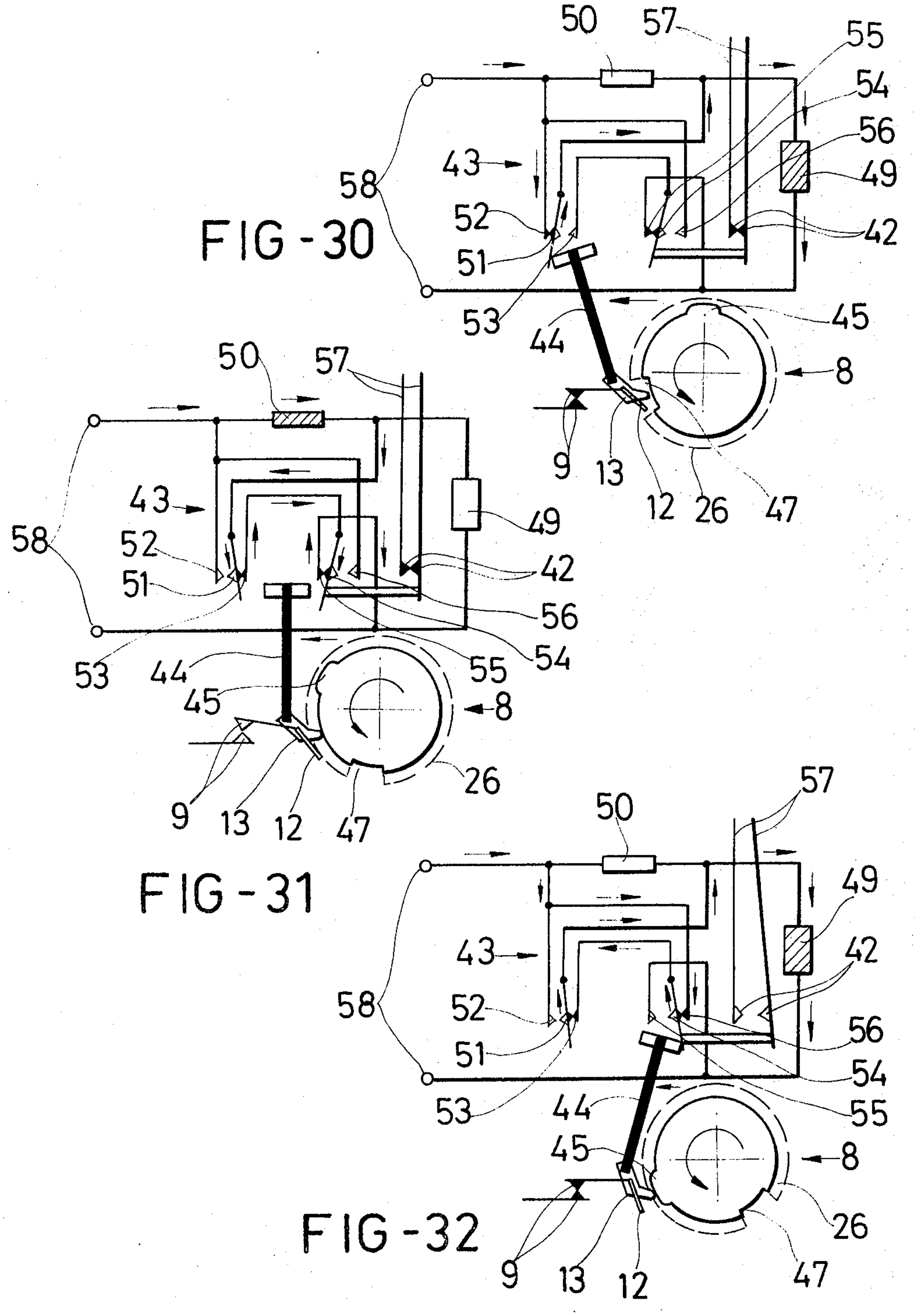

FIG. 30. Diagram of the telephone circuit, with the apparatus in a state of repose, in which the micro-switch transmitting the pulses is shown in mechanical form, in accordance with the situation in which it is at that moment, and its correspondance with the positions occupied by the drum, the shoe of the cursor and the shaft of the said cursor.

FIG. 31. Represents the diagram of FIG. 30 corresponding to the moment of dialling pulses.

FIG. 32. Represents the diagram of FIG. 30, corresponding to the moment of interruption between two phases of dialling pulses, in order to await a second tone.

The construction of the apparatus which constitutes the subject of the present invention is based on the functional organization known, that is to say that the basis consists of the combination of a rotating drum (8), on the periphery of which there are distributed in parallel annular situations groups of material irregularities, with a micro-switch (9) that can move longitudinally in a trajectory parallel to the shaft of the drum, and which on being brought into a position facing each group of irregularities is operated by the latter when the drum is caused to move.

The principal purpose of the invention is the substitution of the conventional memory discs, which are at present employed to constitute the rotating drum of the apparatus, by groups of circular sectors, which can be linked with one another, and which fulfil the same purpose as that of the known conventional system.

Examples of the conventional disc and of the combination that is proposed are schematically represented in FIGS. 1 and 2, respectively, there being programmed, on the basis of peripheral projections and smooth arcs, the same class: 2-5-3-8-1-5-4.

The replacement of the said known discs by the combinable circular sectors makes it necessary to conceive a new type of drum, constituted in such a manner that the said sectors can be easily situated in order, and without loss of time, and it also makes possible the introduction of determined changes and innovations in order to make the apparatus more efficient and secure.

The general structure of the apparatus is indicated in FIGS. 3 and 4. As may be seen, the said apparatus is constituted on the basis of a framework (1), in which, appropriately supported, there is a shaft (2), which is caused to rotate by a motor (4) with the inter-position of a speed reducer (3). On this shaft there is fitted in a juxtaposed manner, and alternating with a plurality of flexible discs (5), a series of rigid discs (6) that constitute the drum for the placing in order of the circular sectors (7) which selectively compact the micro-switch that causes the pulses to be dialled.

Each one of the rigid discs, (6), the characteristics of which may be clearly a appreciated in FIGS. 11 and 12, presents on one of its faces an axial extension (14), circular in form and situated concentrically, which acts as a separator. It is also endowed along the whole of its periphery, with the exception of a short arc (15) with a plurality of radial recesses (16), which do not affect the whole thickness of the disc, but which are prolonged to a certain extent by the same face that includes the separator (14). The other face of the disc has an element (17) in the form of a circular crown, situated in a position parallel to and close to the periphery and includes the central zone 18 delimited by the said element, slightly sunken with respect to the plane that passes through the edges of the said face. Lastly, in the smooth zone (15) of the periphery there exists a projection (19) situated adjacent to the first radial groove (16).

When these discs (6) are fitted on their shaft (2), the flexible discs (5) are housed in the central sunken portion (18) of one of the faces of the said discs, and with their peripheral zone (20), which presents a very open V-shaped fold, situated at the height of the cut in the form of a circular crown (17), which delimits the said central sunken position in which they are housed. These flexible discs remain with their peripheral fold oriented towards the rigid disc adjacent to that in which they are housed, and are provided with a series of radial grooves which divide them into a plurality of sectors that are equal to one another. The grooves, which bear the reference (21) may be perfectly clearly observed in FIG. 10 which shows a section of the drum given by the line A-B of FIG. 3.

The discs situated as has been explained constitute a drum (8), in which there exists a plurality of annular channels (22), each one of which is formed between the face of a rigid disc (6) bearing the axial separator (14) and the opposite face of the adjacent disc, in whose interior the peripheral fold of the flexible discs is arranged in such a manner as to be capable of retaining in a radial direction the lower part of each one of the circular sectors (7) on the basis of which the programming is carried out.

Each one of the circular programming sectors, details of whose construction may be seen in FIGS. 14, 15, 16, 17 and 18, appears with steps in its upper part, presenting in its lower part a transverse cut (23) that contacts the face opposite to that adjacent to the step, and having in the centre of the latter face a projecting piece (24), situated in continuation of the step, that has the same configuration as the radial cuts (16) made in the periphery of the rigid discs (6).

The lower plane (25) of the upper steps of each programming sector is smooth, while the upper plane has a series of equal projecting pieces (26) which are those that are intended to operate the micro-switch that serves to dial the pulses.

In each sector, in addition, there exists a smooth zone (28) that serves to record the figure that corresponds to the number of projecting pieces (26) which it has on its periphery, and there is an orifice (27) through which a tool can be introduced, which will facilitate its extraction from the drum.

The sectors are fitted in a juxtaposed manner in the annular channels (22) of the drum (8), in such a manner that the lower face of their steps is situated on the periphery of a rigid disc (6), and their projecting elements (24) are housed in cuts (16) of the said disc. On their being situated in this position, the lower part of the said sectors is retained in a radial direction by the corresponding flexible disc (5), whose peripheral fold (20) is housed in the recess (23) that each sector has for this purpose. Again, since the sectors are also protected against tangential forces by means of the introduction of their projections (24) into the recesses (16) of the rigid support discs (6), their immobility during the time that they are in contact with the micro-switch is completely ensured.

The micro-switch that dials pulses (9) is situated on a cursor (10) which, in turn, is fitted on a shaft (11), parallel to that of the drum (8), on which shaft it is possible for it to move in an axial direction. The shaft (11), in addition, has the possibility of turning through a certain angle on its supports in the framework, and is forced by a spring, which is not represented, which is intended to cause it to rotate in a clockwise direction.

The cursor (10) has a radial sensing shoe (13), situated proximate to the operating lever (12) of the micro-switch (9, FIG. 7), which, as a consequence of the fact that the shaft (11) of the said cursor is forced to move in the direction of rotation, endeavours to place itself in a secant position with respect to the control sectors of the micro-switch (see FIG. 23).

Lastly, the cursor in question is fitted on its support shaft (11) in such a manner that it cannot rotate in relation to the said shaft, and is capable of being situated in a series of stable positions along the said shaft, which correspond to those that are face-to-face with the micro-switch, which links with each one of the groups of circular programming sectors arranged in an annular manner.

The avoidance of turning movements of the cursor with respect to the shaft along which it moves is produced as a consequence of the fact that the said shaft has a polyginal profile and that the cursor is fitted on the said shaft by means of a tubular extension (30), of the same profile, which grips it.

The obtention of the different stable positions of the cursor on the shaft is achieved by providing on a part of the said shaft and aligned along the whole of its length a series of concave hollows (29), in which, on the cursor being caused to move a bolt (31) with a round head is introduced, which bolt is situated in a channel of the said cursor and which is impelled by a spring (32) whose tension can be varied by means of a screw (33).

On the shaft of the rotating drum (8), in addition to the different elements that constitute it, there is fitted concentrically a new disc (34), which can be observed in FIGS. 3 and 4, which disc presents in a part of its periphery a V-shaped recess (35), into which there can easily enter and emerge the head of an elastic sheet (36), which is shaped for the purpose. On the said elastic sheet there is fitted the moveable contact (37) of a switch (38).

The disc that has been described operates, thanks to its peripheral recess, as a can and simultaneously fulfils two different functions: it fixs the drum in a stable position, which corresponds to the situation when the apparatus is at rest, when the head of the elastic sheet (36) is housed in the recess (35), and maintains the contact (38) closed when the apparatus commences to operate until the drum has completed a revolution.

The switch (38) controls the circuit of the driving-motor of the drum, and is fitted in parallel with respect to another switch (39) which is manually operated, by means of a key, (40). It will consequently be understood that the driving motor can be started up by means of the switch (39) independently of the fact that the other switch (38) is open, and that immediately after starting it will cause the latter switch (38) to close, remaining fed by the said switch during a complete revolution, despite the fact that the first switch (39) is opened.

The material situation of these two switches, in accordance with a purely illustrative form of implementation, may be observed in FIG. 4.

In the said Figure there may also be observed two other switches (41 and 42) likewise inserted in the electrical circuit of the driving motor, which are fitted in series with the switch (38) that automatically closes and in parallel with the switch (39) that is manually operated, the first of which said switches (41) is normally closed, and breaks the circuit only when the apparatus is opened for the purpose of carrying out operations in its interior, while the second switch (42) is fitted jointly with a block (43) of leaf switches, and serves to break the circuit of the motor, and consequently to cause it to stop, during momentary interruptions in the dialling of pulses, in order to await a second dialling tone.

This block of leaf switches (43), and the switch (42) fitted in conjunction with it, is operated by a lever (44) which emerges radially from the shaft (11) along which the cursor (10) slides.

The different movements of rotation that the shaft (11) is compelled to effect, despite its being impelled by a spring towards a stable position, with the purpose that the micro-switch may be situated in an operating position facing each group of programmed sectors and with the aim of producing the necessary switching action during the dialling of pluses, are effected thanks to the thrust which, in a direction opposite to the working direction of the positioning spring, is exercised on the said shaft by determined parts of the drum itself.

The thrust is received by the shaft (11) through a shoe (13) with which the cursor (10) is equipped, which cursor can slide along the said shaft, and is translated into a movement of the micro-switch towards or away from the peripheral teeth or irregularities of the programming sectors, and into a partial turning in one or another direction of the lever (44) that it incorporates for the control of the block (43).

The parts of the block that produce the said movements on the shaft, on overcoming the tension of the spring that constantly tends to maintain it in a position of repose, are the toothed programming sectors themselves and some accessory pieces that are inserted between the sectors, and which serve to detain the dialling of pulses when it is necessary to await a second tone. These accessory pieces (48) that are shown in detail in FIGS. 19, 20, 21 and 22, present exactly the same form of anchorage on the drum and the same configuration as the programming sectors, with the exception of the fact that they lack teeth or projections on the upper plane (46) of their steps, and that they have the lower plane (45) of the said step higher than or further removed from the shaft than that of the said sectors.

For the purpose of clarifying these concepts, and the form in which the mechanical operation of the shaft (11) is effected, reference may be made to FIGS. 10, 23, 24 and 25, which represent corresponding sections of the drum in a position of repose and in different moments of operation of the said shaft.

The drum (8), as a consequence of the fact that each one its rigid discs (6) supporting the sectors has a small arc of its periphery (15) incapacitated for the fitting of the said discs, is equipped, even when its memorizing capacity is fully employed, with an axial channel (47), which is formed by means of the conjunction of the above-mentioned smooth zones (15) of all the supporting discs.

When the apparatus is at rest, the drum is retained in a stable position by means of the cam-disc (34) and the flexible sheet (36, FIG. 4) in which the said channel (47) is approximately facing the shaft of the cursor. This position is represented in FIG. 23, in which Figure it may be observed that the shoe (13) of the cursor remains, during the said position, contained in the channel (47), in a situation that is secant with respect to the programming sectors (7). This position is, likewise, that which corresponds to the rest position of the shaft (11), which is now subjected only to the action of the spring, which is not represented, and which trying to rotate it clockwise encounters a check which is not represented, which maintains it in the said situation. This relative positioning between the drum (8) and the shaft (11) of the cursor, in which the shoe (13) of the cursor can slide freely along the whole length of the drum, utilizing the channel (47), makes it possible for the micro-switch to be caused to face, in a selective manner, any annular grouping of programmed sectors, with the purpose that the apparatus on commencing to operate will dial the pulses that are required.

The operating position is represented in FIGS. 24 and 10. In the former, it may be observed that the shoe (13), on the drum (8) beginning to rotate, has been thrust in a direction opposite to that of the action of the positioning spring of the shaft by the lower plane (25) of the upper step of the programming sectors (7), which compels it to adopt a new position. While this position lasts the operating lever (12) of the micro-switch (9) is exposed to the action of the irregularities (26) of the said sectors (see FIG. 10), and the shaft (11) is situated in such a manner that its radial lever (44), which during repose occupied the position represented in FIG. 4, proceeds to occupy the position shown in FIG. 5. The said lever, as may be observed, on passing from the moment of repose to that of the dialling of pulses has produced in the block (43) a switching action, the nature and object of which will be explained later in the telephone circuit diagrams included in the annexed set of drawings.

The position represented in FIG. 25 corresponds to that of an intermediate stop between the dialling of two series of pulses, when this becomes necessary in order to await the reception of a second dialling tone.

As may be appreciated, the shoe (13), on the drum (8) continuing to rotate and contacting one of the accessory pieces (48) provided for the purpose, has been thrust a little more in opposition to the action of the positioning spring of the shaft (11), by means of the lower plane (45) of the step of the said piece, which is further from the shaft than the homologues of the programming sectors, as has already been explained.

On the shoe (13) adopting the new position, new positions are also adopted by the operating lever (12) of the micro-switch (9) and the radial lever (44) of the shaft (11), which are moved synchronously with it. The former of the said elements, as may be seen in FIG. 10, is moved outwards in relation to the drum, moving away from the piece (26) of the programming sectors (7), and the second of the elements in question is situated as shown in FIG. 6, producing a new switching action in the block (43) and opening the switch (42) action produces the stopping of the driving motor.

The electrical diagram of the apparatus, including the telephone circuit and that of the driving motor, is represented in FIG. 26, with the various commutators and switches in the positions that correspond to the apparatus in repose. As may be seen, the circuit (57) of the driving motor, in addition to the motor (61) itself, a luminous operating indicator that a fuse (59), a voltage regulator (60), and whatever accessory and safety elements are necessary or advisable, includes four switches (39, 42, 41 and 38), of which the first (39) is fitted in parallel with respect to the others in relation to the motor, and is manually operated, while the others are automatically operated, in accordance with different causes, and are fitted in series with respect to one another. Of these switches, with the apparatus in response, the manual switch (39) is open, as is one of the automatic switches (38) which is operated by a cam (34) fitted on the drum, and the other two automatic switches (41 and 42) are closed, these switches being respectively controlled by the cover of the apparatus on its being opened, and by the lever (44) that emerges radially from the shaft (11) along which the cursor (10) slides.

With respect to the circuit of the telephone line (58), leaving out of account the conventional accessories elements, the micro-switch for dialling pulses (9), the telephone itself (49) and a resistance (50) provided for short-circuiting the said telephone for the purposes that will be explained, it includes a block of leaf switches (43) that consists of two leaf switches, each one with two fixed contacts and one moveable contact. The moveable contacts (51 and 54) of these leaf switches are directly sectioned by the radial lever (44) of the shaft (11) of the cursor, and one of them (54) is mechanically related to the moveable contact of the switch (42) of the circuit of the driving motor, in such a manner that they move synchronously.

In the position of repose of this circuit, the moveable contacts of the leaf switches are situated in such a manner that they short-circuit the resistance (50), and the micro-switch for dialling pulses is at rest.

In order to follow clearly the effects produced in the telephone circuit by the mechanical relationship between the drum and the cursor, there have been shown in FIGS. 30, 31 and 32 diagrams of the said circuit in combination with the drum (8) and with the means that produce the operation of the said drum. In the diagrams in question, and with the aim that there can be verified the correspondance that exists between the movements of the drum (8) the movements of the micro-switch for dialling pulses (9) and those of the leaf switches, the said micro-switch (9) has been represented in mechanical form instead of integrating it in the circuit.

As may be observed in FIG. 30 and as has been previously explained, when the apparatus is in its position of repose, the shoe (13) of the cursor, and with it the lever (12) or controlling the micro-switch (9), are housed in the axial channel (47) of the said drum (8), in which none of the elements is thrust by the programming sectors. As a consequence of this, the micro-switch (9) is closed and the radial lever (44) of the shaft (11) of the cursor, whose annular movement is controlled by the shoe (13) itself, thrust against the moveable contact (51) of one of the leaf switches which is held against the fixed contact (52). The other moveable contact (54) is in its position of repose, which corresponds to that of connection with one of its fixed contact (55) and maintains the switch (42) closed, which switch is inserted in the circuit (57) of the driving motor, to which moveable contact it is mechanically linked.

When the drum commences to turn and the shoe (13) is raised by the operation of the programming sectors (FIG. 31), the lever (12) for operating the micro-switch (9) is operated by the teeth (26) of the said sectors, producing repeated openings of the said micro-switch, which are translated into diallings of pulses on the line. The lever (44), governed by the shoe, ceases to thrust the moveable contact (51), which, as the result of its elasticity, proceeds to make contact with the other fixed contact (53).

Again, if in the drum (8) there has been inserted between the programming sectors one of the pieces (45) of those intended to produce momentary stops between the dialling of two series of pulses for the purpose of receiving a second tone, when the said intermediate piece (45) reaches the shoe (13) it will cause the latter to move further away (FIG. 32), which will produce the result that the lever (12) governing the micro-switch (9) will remain beyond the reach of the teeth (26) that produce its operation, and the lever (44) will adopt a new position in which it will force the moveable contact (54) of the block (43) to become separated from the fixed contact (55), placing it in connection with the other fixed contact (56) and causing, that on making the said movement, it will push the moveable contact of the switch (42) of the circuit of the driving motor, which will become separated from the fixed contact, thus producing the stopping of the said motor.

The presence of the block of leaf switches (43) in the telephone circuit represents the solution, in accordance with an organization adapted to the rest of the characteristics of the apparatus being described, of one of the problems derived from the form in which the pulses are dialled.

The fact that the pulses originate as the consequence of repeated breakings of the circuit produced by a micro-switch gives rise, in the construction of any telephone apparatus, to two problems: the avoidance of sparks during the circuit-breaking , so that the contacts of the micro-switch will not be burned in a brief space of time, and the avoidance of the clicking sounds that are produced in the earpiece of the telephone that are produced by the breakings of the circuit on their being amplified by the apparatus.

The first problem is easily solved by means of employment of a rapid-break micro-switch, in which the arc is of very short duration, which micro-switch is situated in parallel with a condensor and a resistance intended to absorb the spark.

The second problem also has a simple solution, which consists in placing a resistance in series with the telephone apparatus and short-circuiting the telephone, routing the line through the resistance during the circuit-breakings, and again bringing the apparatus into service on the termination of the dialling, then short-circuiting the resistance.

Both problems are given a similar solution in the apparatus that is proposed, but the second of them is solved in accordance with the remaining functional peculiarities, of the automatic device for dialling pulses, in which, apart from the normal situations of stopping and dialling, it is necessary to consider one or more situations of stopping, of a nature differing from the normal, provided, as is already known, for the reception of two or more dialling tones.

This makes it necessary to conceive a special electrical organization, which is that which is represented in the diagrams commented on and which, concretely, consists of the following:

The resistance (50) and the telephone (49) are connected in series to one another, and from between both of them there emerges a connection that terminates in the moveable contact (51) which, when the apparatus is at rest, is thrust by the lever (44).

The fixed contact (52), with which the moveable contact last mentioned is in connection when the apparatus is at rest, is connected to the same line in which there are installed in series the resistance (50) and the telephone (49) in front of the said resistance. The same contact, moreover, is connected in a permanent manner to the fixed contact (56) of the other leaf switch which, when the apparatus is at rest, is not affected by the corresponding moveable contact (54).

Lastly, the moveable contact (54) referred to above is permanently connected to the fixed contact (53) of the other leaf switch, and the fixed contact (55) with which it engages when the said moveable contact (54) is in repose is connected with the line of connection between the resistance and the telephone, at the outlet of the telephone.

The form in which this block of leaf switches obtains the effect intended, on operating under the action of the drum (8), will be explained in what follows with the aid of FIGS. 27, 28 and 29, which represent corresponding diagrams of the telephone line at the moment of operation, which correspond to those shown in the diagrams of FIGS. 30, 31 and 32.

In the diagrams that we shall now comment on, the micro-switch for dialling pulses (9) appears as forming part of the circuit, in order that it may be easily understood in relation to the remaining elements.

The representation shown in FIG. 27 corresponds to the rest position of the apparatus, as is already known, and in the said representation it may be observed that the micro-switch (9) out of service at that moment (see FIG. 30) is connected in series with the telephone (49) through the contacts of the leaf switch (51 and 52). Consequently it is evident that the telephone (49) is in operation and in a position to receive the dialling tone, and that, in accordance with its situation the resistance (50) is short-circuited.

When the drum (8) has rotated, and the teeth (26) of the programming sectors have commenced to produce the circuit-breakings of the micro-switch (9), (see FIG. 31), the leaf switch has varied its position and has caused, as may be seen in FIG. 28, the said micro-switch to remain in connection with the resistance (50), maintaining, on the other hand, the telephone (49) short-circuited, which in this manner is not affected by the circuit-breakings.

Later, on the cursor reaching one of the intermediate pieces (45) and the micro-switch ceasing to operate (see FIG. 32), a new switching is produced in which the resistance (50) is again short-circuited (FIG. 29), and the telephone (49) is in service awaiting the reception of the dialling tone.

In order to enable the overall functioning of the apparatus that constitutes the subject of this invention, and so that its different possibilities may be evident, there is explained in what follows the form in which it is operated when applied to the selection of telephone numbers.

Once the memory drum has been loaded with the different annular groups of programming sectors, which constitute the codes of telephone connection stored, the user should manually position the cursor (10) to face the group that it is intended to convert into pulses in the line, and should then press the starting key (40) to close the switch (39).

On the switch (39) being closed, the motor (61) is started up, there being simultaneously illuminated an indicator (62), and the switch (38) is closed automatically, so that even if the switch (39) is then opened because of the key ceasing to be pressed, the motor continues to be fed, and consequently continues to operate, unless its circuit is broken by another cause, until the drum has not performed a complete revolution.

Simultaneously with the starting-up of the drum, the telephone is short-circuited so that the circuit-breakings that the micro-switch produces on being contacted by the programming toothed sectors will not be translated, on being amplified, into loud clicking sounds in the earpiece.

When the dialling of a series of pulses terminates, if the telephone communication it is intended to produce is obtained directly through the said series and without the need of a further dialling, the shoe of the cursor enters an empty space on completing the group of programming sectors that gave rise to the dialling effected, and immediately, even though the drum has not finished giving a complete revolution, the telephone ceases to be short-circuited and proceeds to enter into service.

If, on the contrary, on completing the dialling of the first series of pulses it is necessary to await one or more tones in order to carry out further dialling(for example in the case that a call is made from an interior telephone that must establish communication with a switchboard from which it receives a tone indicating that dialling is again to be made), the apparatus, by means of the pieces (48) that are inter-posed between the groups of sectors that carry each code programmed, produces as many stops and commutations as may be necessary for the obtention of the final communication that is desired.

It is not considered necessary to extend this description further so that any person expert in the manner may perfectly understand the idea that it is intended to register and the advantages that are derived from its industrial implementation.

I claim

1. An automatic device for dialling pulses comprising a drum having a shaft, an electric motor for rotating said drum, a first circuit for said motor, a switch in said circuit, a second shaft parallel to said shaft, a plurality of discs on said drum having on their periphery a series of groups of irregularities programmed in accordance with a determined code, extensions on said discs, a micro-switch inserted in a telephone line for engaging said irregularities, means selectively bringing said micro-switch opposite said discs when rotated by said motor, means short-circuiting said micro-switch and simultaneously the telephone line with which said micro-switch is incorporated, a movable cursor on said second shaft for said micro-switch for adopting multiple stable positions, said cursor having a sensing shoe which on sliding over said extensions causes said micro-switch to be exposed to the action of said irregularities, said discs comprising independent circular sections which can be combined, means securing said sections against radial and tangential forces comprising rigid and flexible discs mounted alternatingly and juxtaposed concentrically on said shaft, a cam on said drum for locking said drum in a stable position when said device is at rest and automatically closing said switch for a complete revolution of said drum, a second circuit for said motor in parallel with said first circuit for starting said motor, a manually operated switch in said second circuit, separating pieces capable of stopping said drum between every two groups of irregularities of the same disc and a telephonic switching action whereby the telephone ceases to be short-circuited during the time that stopping of said drum lasts, and said second shaft is capable of turning through a predetermined angle between two check-pieces, a spring urging said second shaft in a clockwise direction to adopt three different positions depending upon whether the cursor falls into an empty space, slides over programming sectors or slides over said separating pieces between groups of sectors of the same disc, a block of leaf switches, a radial lever on said cursor cooperating with said block, said block operating so that when said device is sending pulses the telephone is short-circuited, when said block is at rest, or momentary stopping between two emissions of pulses, produced by the pieces that are inserted between the groups of programing sectors, then the telephone is in service, whereby the situation of momentary stopping is originated by the leaf switches themselves on producing, simultaneously with the switching the opening of a switch, with the result that it is mechanically related, inserted in the circuit of the driving motor and connected in series with that of automatic control and is parallel with that of manual control.

2. An automatic device in accordance with claim 1 wherein each one of said sectors has a profile whose upper part contains steps and whose lower part has a transverse curved and concentric recess that engages the face opposite to that adjacent to the step; in the center of the face adjacent to the step there is a projecting piece situated in continuation of said step that is radially oriented and has the lower plane of its upper step smooth, while the upper plane of the same step is fitted with a variable series of equal projecting pieces which engage the micro-switch for dialling pulses.

3. An automatic device in accordance with claim 1 wherein said sectors have in their upper part a smooth zone provided for recording the figure that corresponds to the number of projecting pieces that exist in the periphery, and has an orifice for the introduction of a tool to facilitate its extraction from the drum.

4. An automatic device in accordance with claim 1 wherein said rigid discs have on one of their faces an axial extension of circular form situated concentrically forming a separator, said discs having on the whole of their periphery with the exception of a short arc a plurality of radial recesses which are prolonged to a certain extent, and which have the same section as the radial projections provided in said sectors adjacent to their upper steps, an element in the form of a circular crown in the face opposite to that of the axial separator situated in a position parallel to and very near the periphery, which element delimits a central zone that is higher than but slightly sunken with respect to the plane that passes through the edges of said face, and because in the smooth peripheral zone there exists a radial projection situated adjacent to the first radial recess.

5. An automatic device in accordance with claim 1 wherein said flexible discs are laminar and have a peripheral fold forming on their edges a very open V-shaped section, said flexible discs being divided into a plurality of different portions by radial points that do not reach the central orifice for the passage of the shaft.

6. An automatic device in accordance with claim 5 wherein each flexible disc is housed within the hollowed zone of the face of a rigid disc opposite to that which carries the axial separator, having its peripheral fold facing the recess in the form of a circular crown that delimits said sunken zone, and the edge resulting from the said peripheral fold being oriented towards the adjacent rigid disc.

7. An automatic device in accordance with claim 6 wherein said sectors are mounted on said drum by introducing their lower part into the channel delimited by two of said rigid discs so that their radial projection adjacent to the upper step is housed in one of said recesses, which have the same configuration and are also radial, provided in the periphery of the rigid discs and so that in the transverse curved concentric recess that exists in the face opposite to that adjacent to said upper step, there is housed the V-shaped peripheral fold of a flexible disc included between said rigid discs.

8. An automatic device in accordance with claim 1 wherein said pieces of separation between each group of said sectors to produce momentary stoppages, present the same form of anchorage and configuration as the programming sectors, with the exception of the fact that they lack projections in the upper plane of their stop and that they present the lower plane of said step with a larger radius than that of said sectors.

9. An automatic device in accordance with claim 1 wherein said cam operating said manually operated switch comprises a disc having on its periphery a recess shaped in the form of an open V, and an elastic sheet carrying the movable contact of the switch that the cam controls cooperating with said recess.

10. An automatic device in accordance with claim 1 wherein the change of position of said second shaft is effected as a consequence of the fact that the sensing shoe of said cursor is thrust in a direction contrary to that of the angular requirement of said shaft by the lower plane of the upper step of a separator piece between two groups of said sectors of the same disc, which have a larger radius than that of said sectors.

* * * * *